US009346534B2

(12) United States Patent
Langley et al.

(10) Patent No.: US 9,346,534 B2
(45) Date of Patent: May 24, 2016

(54) SUPPORT ASSEMBLY (71) Applicant: AIRBUS OPERATIONS LIMITED, Bristol (GB)

(72) Inventors: Anthony Langley, Bristol (GB); Simon King, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 141 days.

(21) Appl. No.: 14/101,791

(22) Filed: Dec. 10, 2013

(65) Prior Publication Data
US 2014/0158822 A1    Jun. 12, 2014

(30) Foreign Application Priority Data

Dec. 11, 2012   (GB) .................................. 1222308.7

(51) Int. Cl.
*B64C 9/02*  (2006.01)
(52) U.S. Cl.
CPC ... *B64C 9/02* (2013.01); *Y02T 50/44* (2013.01)
(58) Field of Classification Search
CPC .............. B64C 3/50; B64C 9/02; B64C 9/04; B64C 9/06; B64C 9/16–9/28
See application file for complete search history.

(56) References Cited

U.S. PATENT DOCUMENTS

| 5,651,513 | A  | * | 7/1997 | Arena ........................... 244/99.3 |
| 7,063,292 | B2 | * | 6/2006 | Perez-Sanchez ............. 244/216 |
| 8,967,550 | B2 | * | 3/2015 | Schlipf et al. ................. 244/214 |

FOREIGN PATENT DOCUMENTS

| GB | 2102356 A | * | 2/1983 |
| GB | 2362363 A |   | 11/2001 |
| GB | 2402914 A |   | 12/2004 |
| WO | 2011054047 A1 | | 5/2011 |

OTHER PUBLICATIONS

Corresponding United Kingdom Application No. 1222308.7 Search Report dated Apr. 10, 2013.

* cited by examiner

*Primary Examiner* — Tien Dinh
*Assistant Examiner* — Richard R Green
(74) *Attorney, Agent, or Firm* — Hauptman Ham, LLP (57) ABSTRACT An assembly to support a wing leading or trailing edge device during deployment and retraction of the device includes a fixed support member attachable to the support structure of an aircraft wing, an intermediate link arm having one end pivotally mounted for rotation relative to the support member about a first axis and, a primary link arm having a first end pivotally mounted to the opposite end of the intermediate link arm for rotation relative to the intermediate link arm about a second axis. A second end of the primary link arm is for attachment to the device via a bearing element so that the device can move relative to the primary link arm in any direction when the intermediate and primary link arms rotate about the first and second axes, respectively, during deployment or retraction of the device from the aircraft wing.

14 Claims, 7 Drawing Sheets

SUPPORT ASSEMBLY

RELATED APPLICATIONS

The present application is a based on and claims priority to United Kingdom Application Number 1222308.7, filed Dec. 11, 2012, the disclosure of which is hereby incorporated by reference herein in its entirety.

INTRODUCTION

The present invention relates to a support assembly for supporting an aero surface, such as a flap that extends from the trailing edge of an aircraft wing, during deployment and retraction of said surface. The invention also relates to an aircraft wing comprising at least one aero surface attached to an edge of an aircraft wing using the support assembly of the invention.

BACKGROUND

Aircraft need to produce varying levels of lift for take-off, landing and cruise. A combination of wing leading and trailing edge devices are used to control the wing coefficient of lift. The leading edge device is known as a slat whereas the trailing edge device is known as a flap. On larger aircraft there may be several flaps spaced along the trailing wing edge. During normal flight the flaps are retracted under the trailing edge of the wing. However, during take-off and landing they are deployed rearwardly of the wing so as to vary the airflow across and under the wing surfaces to reduce the speed of the aircraft and control the angle of descent. The flaps usually follow an arcuate or curved path between their stowed and deployed positions. By varying the extent to which the flap is deployed along said path, the lift provided by the wing can be controlled.

Figure 1:
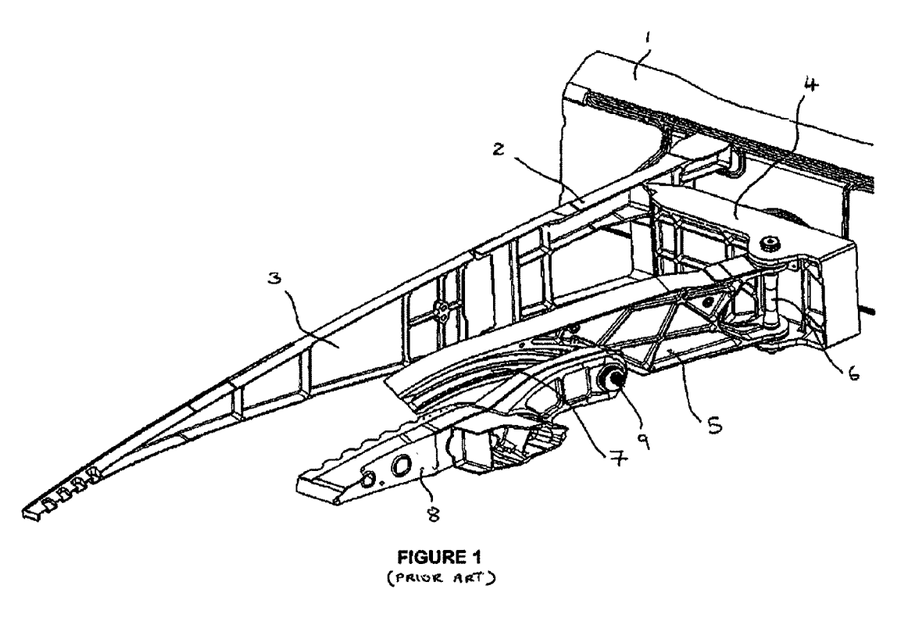
FIG. 1 shows a perspective view of a swinging link flap support assembly according to the prior art.

An assembly is required to support and guide movement of a flap between stowed and deployed positions and a typical arrangement of a swinging track flap support assembly commonly used on larger aircraft is shown in the isometric view of FIG. 1. A swinging track design is required for larger aircraft, as the flaps must be able to follow a constantly changing three-dimensional path to allow for extension that is widthwise and perpendicular to the direction of air flow across the wing at its fully deployed position.

With reference to FIG. 1, there is shown a mid rear spar 1 of an aircraft wing and aileron closing ribs fore and aft 2, 3. A bracket hinge 4 is attached to the fore aileron closing rib 2 and a swinging arm 5 is connected to the bracket hinge 4 for rotation about a fail-safe pin 6. The swinging arm 5 has an arcuate guide track 7 and a roller carriage (not shown) is mounted to the swinging arm 5 for movement along the guide track 7. The roller carriage is connected to a flap via a bearing 9 and a flap rib 8, the flap being directly mounted to the flap rib 8.

As the flap rib 8 is extended, the roller carriage moves along the guide track 7. Sideways or lateral movement of the flap rib 8 in a direction along the length of the wing causes the arm 5 to pivot about pin 6. The combination of the bearing 9 and swinging arm 5 allows the flap rib 8 to be supported along its required path and throughout its entire range of movement without jamming.

It will be appreciated that space for components within the wing structure close to the trailing edge of an aircraft wing is very limited. The requirement to house a number of different components and fuel tanks places considerable design restrictions on the shape of the wing in addition to increasing weight, manufacturing costs and complexities.

It is therefore desirable to provide a light and robust support assembly that takes up a minimum amount of space within the wing structure but which still provides support throughout the entire range of movement of a wing trailing or leading edge device.

SUMMARY OF THE INVENTION

According to the invention, there is provided an assembly to support a wing leading or trailing edge device during deployment and retraction of said wing leading or trailing edge device from a wing of an aircraft, the assembly comprising a fixed support member attachable to the support structure of an aircraft wing, an intermediate link arm having one end pivotally mounted to the support member for rotation relative to the support member about a first axis and, a primary link arm having a first end attached to the opposite end of the intermediate link arm such that the primary link arm and intermediate link arm are movable relative to each other, a second end of the primary link arm being configured for attachment to a wing leading or trailing edge device, the arrangement being such that the assembly allows a wing leading or trailing edge device to move in any direction during deployment or retraction of said wing leading or trailing edge device from an aircraft wing.

In a preferred embodiment, said first end of the primary link arm is attached to said opposite end of the intermediate link arm via a bearing element so that the primary link arm, together with a wing leading or trailing edge attached to the second end of the primary link arm, can move relative to the intermediate link arm in any direction during deployment or retraction of said wing leading or trailing edge device from an aircraft wing.

Preferably, the second end of the primary link arm is configured for attachment to a wing leading or trailing edge device so that the wing leading or trailing edge device can pivot relative to the primary link arm about a second axis during deployment or retraction of said wing leading or trailing edge device from an aircraft wing.

In an alternate embodiment, the first end of the primary link arm may be attached to the opposite end of the intermediate link arm for rotation relative to the intermediate link arm about a second axis during deployment or retraction of said wing leading or trailing edge device from an aircraft wing.

Preferably, the second end of the primary link arm is then configured for attachment to a wing leading or trailing edge device via a bearing element so that a wing leading or trailing edge device can move relative to the primary link arm in any direction during deployment or retraction of said wing leading or trailing edge device from an aircraft wing.

In any of the preferred embodiments, the first and second axes are not parallel to each other and the first axis may be substantially vertical.

Preferably, the support member comprises a bracket immovably mountable to a structural component of the aircraft wing. The structural component may be a rib of the aircraft wing.

In a preferred embodiment, a pivot pin extends through said one end of the intermediate link arm and the support member to pivotally attach the intermediate link arm to the support member for rotation about said first axis.

The support member may comprise a pair of spaced webs and said one end of the intermediate link arm may then also comprise a pair of spaced flanges, the flanges being received between the webs of the support member so that holes in the webs and in the flanges align. The pin may then be received through said holes to couple the intermediate link arm to the support member for rotation about said first axis.

A second pivot pin may extend through said opposite end of the intermediate link arm and the primary link arm to pivotally attach the intermediate link arm to the primary link arm for rotation about said second axis.

The opposite end of the intermediate link arm may comprise a pair of spaced flanges and said first end of the primary link arm comprises a pair of spaced flanges that are spaced by a distance which is less than the distance between the spaced flanges on the intermediate link arm so that the flanges of the primary link arm fit between the flanges of the intermediate link arm. The second pivot pin may then extend through aligned holes in said flanges to couple the primary link arm to the intermediate link arm for rotation about said second axis.

In one embodiment, the assembly comprises a bearing element connecting said opposite end of the intermediate support arm to said first end of the primary support arm. Preferably, the bearing element is configured to allow the primary support arm and the wing leading or trailing edge device to rotate relative to the intermediate support arm in any direction.

In an alternate embodiment, a bearing element is provided at said second end of the primary link arm for rotation of a flap attached to said assembly relative to the primary link arm. The bearing element is preferably configured to allow the flap to pivot relative to the primary link arm in any direction.

The bearing element may comprise inner and outer bearing races with the inner bearing race being received within and rotatable relative to the outer bearing race. The outer bearing race may then be immovably mounted in an opening at said second end of the primary link arm.

The inner bearing race is preferably mounted to the flap and is slideably received within the outer bearing race.

In a preferred embodiment, the flap includes support flanges and a shaft extending between said flanges. The inner bearing race may then either be attached to, or may be formed by, said shaft.

According to another aspect of the invention, there is provided an aircraft wing having at least one wing leading or trailing edge device and at least one support assembly according to the invention supporting the or each wing leading or trailing edge device.

DESCRIPTION OF THE DRAWINGS

Embodiments of the invention will now be described, by way of example only, with reference to FIGS. 2 to 7 of the accompanying drawings, in which.

Referring now to FIGS. 2 to 6, there is shown a support assembly 10 according to an embodiment of the present invention which supports a wing trailing edge device or flap 11 (only part of which is shown) on an aircraft wing during its deployment and retraction from the trailing edge of the wing.

The wing structure includes a spar 13 and a rib 14. A fixed support member 15 is immovably attached to a mid-section of the rib 14 using conventional means such as bolts (not shown). As can more closely be seen from the enlarged view of the fixed support member 15 in FIG. 4, it is an integral component having a mounting flange 16 with holes 17 through which bolts (not shown) may be passed to attach it to the rib 14. A main body portion 18 upstands from the flange 16 and may have various cut-out sections to reduce weight. Two pairs of spaced, parallel webs 19,20 upstand from the free end of the support member 15 so that they are spaced from the rib 14. The webs 19, 20 of each pair are separated by a gap 'X' and the ribs 19 of one pair are separated from the ribs 20 of the other pair by a larger gap 'Y'. The support member 15 is attached to rib 14 so that the webs 19,20 extend in a substantially horizontal direction laterally away from the rib 14. Each web 19, 20 is provided with a hole 21. The hole 21 in each web 19, 20 is in alignment with the hole 21 in each of the other webs 19,20.

Figure 2:
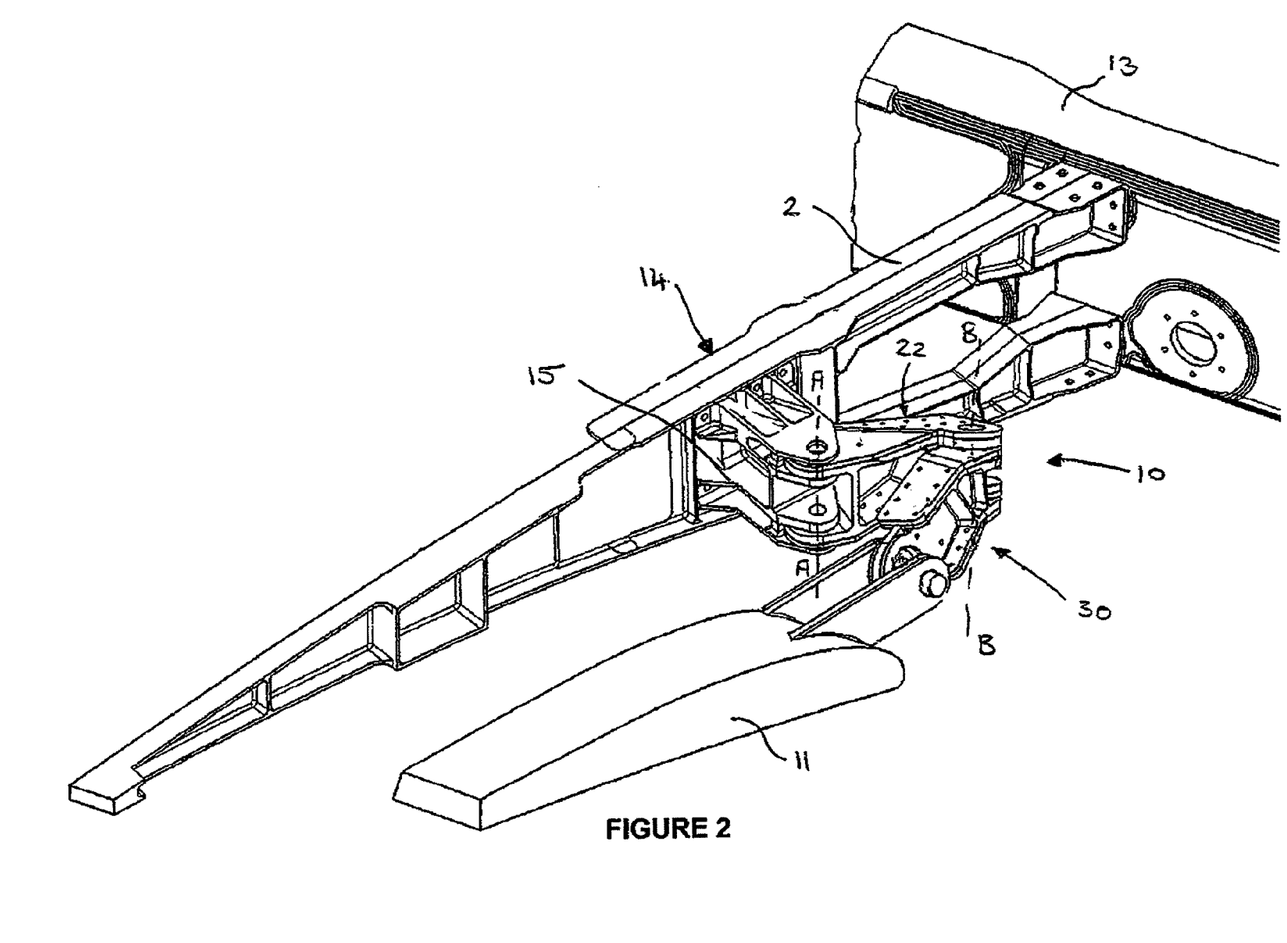
FIG. 2 shows a perspective view of a flap support assembly according to an embodiment of the present invention in its stowed position, the support assembly being connected to a flap.
Figure 3:
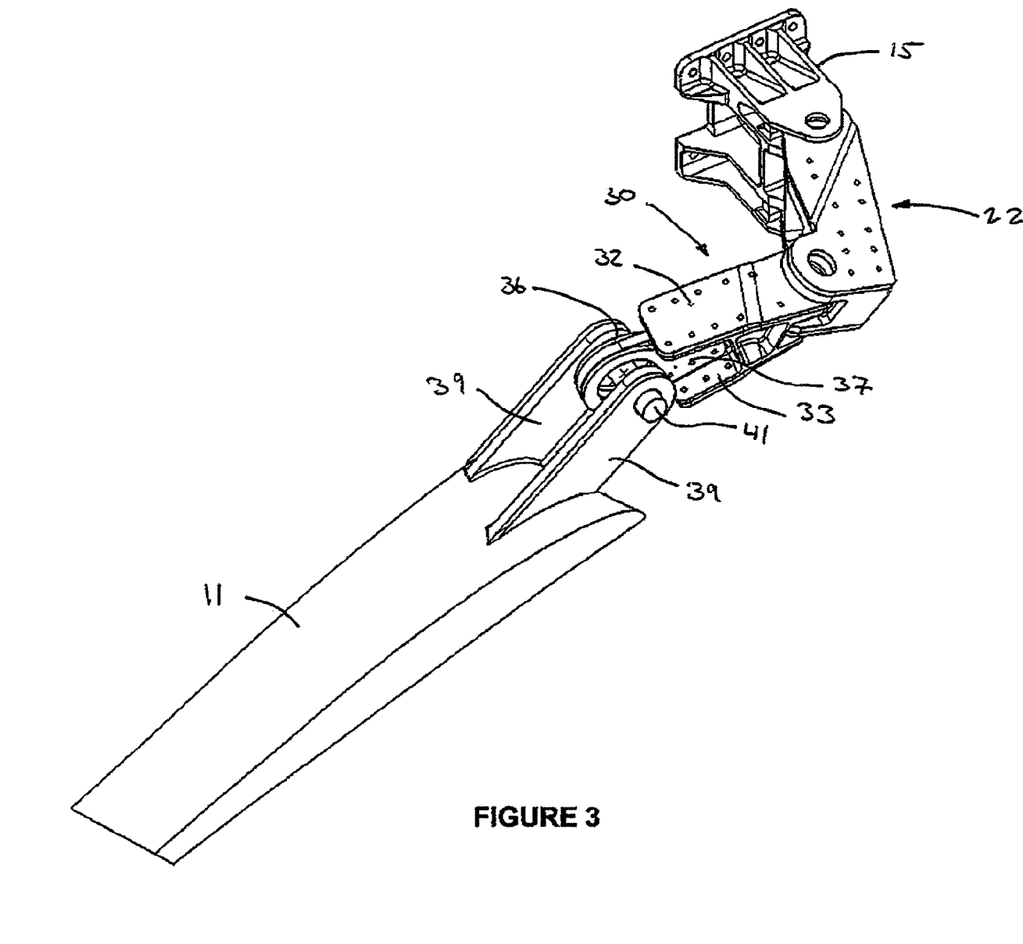
FIG. 3 shows a perspective view of a flap support assembly shown in FIG. 2, but with the components of the aircraft wing structure omitted and shown with the flap in its deployed position.
Figure 4:
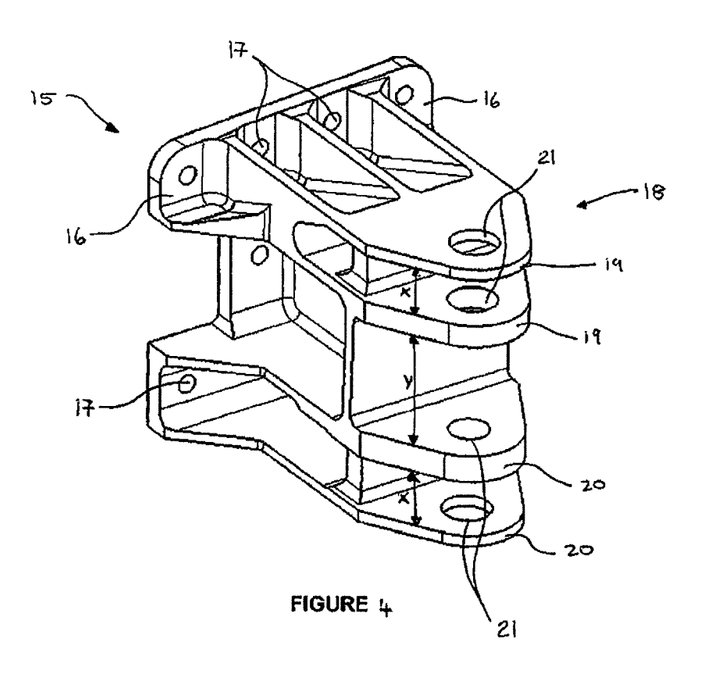
FIG. 4 shows a perspective view of the support member of the support assembly illustrated in FIGS. 2 and 3.
Figure 5:
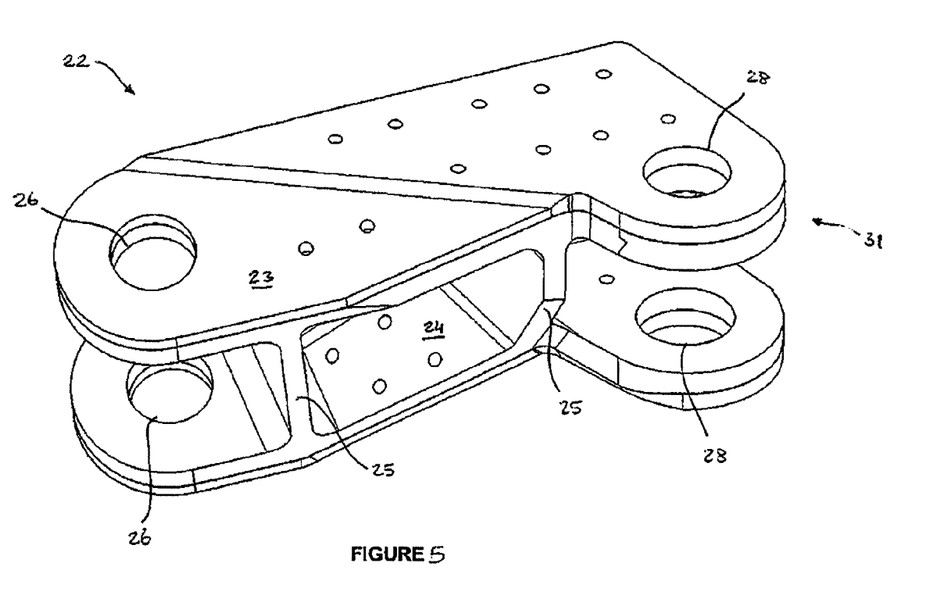
FIG. 5 shows a perspective view of the intermediate link arm of the support assembly illustrated in FIGS. 2 and 3.
Figure 6:
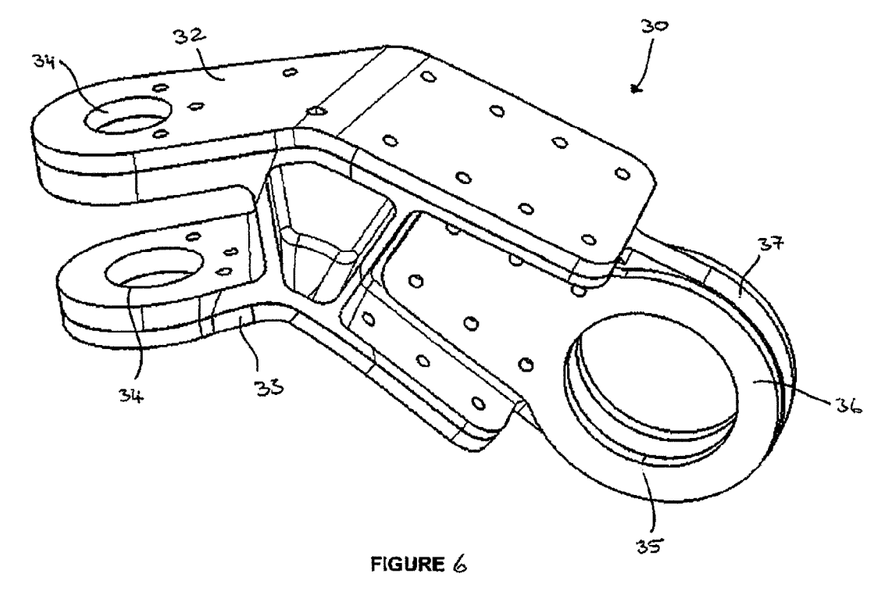
FIG. 6 shows a perspective view of the primary link arm of the support assembly shown in FIGS. 2 and 3.

An intermediate link arm 22 is coupled to and extends from the support member 15 so that the intermediate link arm 22 can rotate relative to the support member 15 about a substantially vertical axis (A-A, see FIG. 2). As most clearly visible in the enlarged view of FIG. 5, the intermediate link arm 22 is integrally formed as a unitary component and comprises two parallel plates 23,24 joined to each other by braces 25. The plates 23,24 are separated from each other by a predetermined distance and have a predetermined thickness so that one plate 23 will locate in the gap 'X' between the first pair of webs 19 of the support member 15 whilst the other plate 24 will locate in the gap 'X' between the other pair of webs 20 of the support member 15 at one end of the intermediate link arm 22. Each plate 23,24 has a hole 26 therein which aligns with the holes 21 in the webs 19,20 of the support member 15 when inserted in the gaps therebetween. The intermediate link arm 22 is connected to the support member 15 by inserting a pin (not shown) through the holes 21 in the webs 19,20 of the support member 15 and through the holes 26 in the plates 23,24 of the intermediate link arm 22 received between the webs 19,20. The thickness of the plates 23,24 is slightly less than the height of the gap "X" between each of the webs 19,20, so that the intermediate link arm 22 can rotate freely relative to the support member 15 about the longitudinal axis of the pin inserted through holes 21, 26. This axis is indicated by A-A in FIG. 2.

The plates 23, 24 at the opposite end of the intermediate link arm 22 extend laterally to form a leg section 31 for connection to a primary link arm 30 via a similar pivotal connection. More specifically, the leg 31 of each plate 23, 24 is provided with an aligned hole 28 to receive a pin (not shown) to pivotally attach the other end of the intermediate link arm 22 to one end of a primary link arm 30 so that the primary link arm 30 can rotate freely relative to the intermediate link arm 22 about the longitudinal axis of the pin coupling the intermediate link arm 22 to the primary link arm 30. This axis is indicated by B-B in FIG. 2. The plates 23, 24 of the intermediate link arm 22 may be slightly kinked or twisted between their ends so that the axis (A-A) between the support member 15 and the intermediate link arm 22 is not parallel to the axis (B-B) between the intermediate link arm 22 and the primary link arm 30.

The primary link arm 30 is also formed as a unitary component and has a first end formed from spaced, parallel plates 32, 33. Each plate 32, 33 has a hole 34 therein and they are spaced from each other by a distance which is slightly less than the distance between the plates 23, 24 at the leg end 31 of the intermediate link arm 22 so that the plates 32,33 fit between the plates 23,24 to align the holes 28 with the holes 34. A pin (not shown) is inserted through the aligned holes 28,34 so that the primary link arm 30 can freely rotate relative to the intermediate link arm 22 about the longitudinal axis B-B of the pin.

Figure 7:
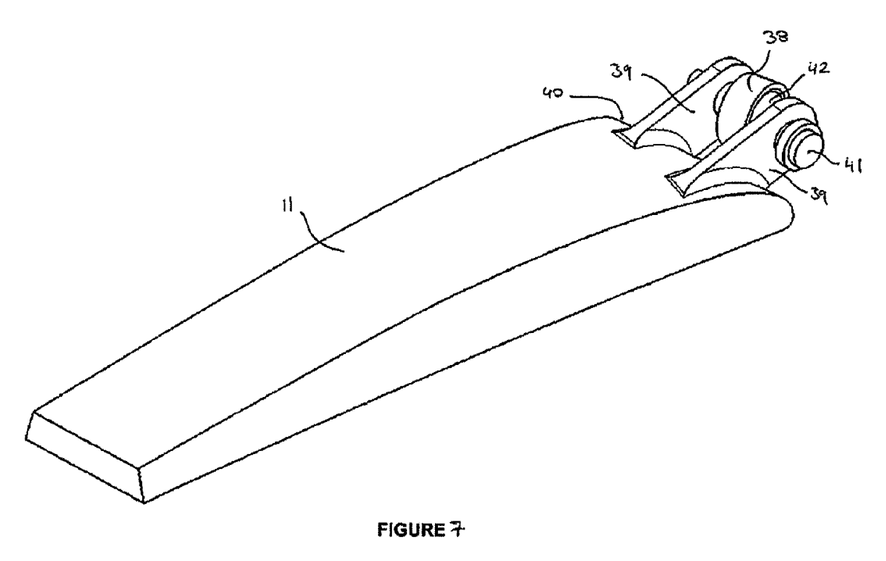
FIG. 7 shows part of a flap to be supported by the support assembly of FIGS. 2 to 6.

At the opposite, free end of the primary link arm 30, there is provided an enlarged opening 35 formed between a pair of plates 36,37 that extend substantially at right-angles from between the parallel plates 32,33. The opening 35 is designed to receive and immovably mount a bearing seat 38 (see FIG. 7) that forms the outer shell of a part-spherical bearing element and which has an inner part-spherical bearing surface.

The other bearing seat, which forms the inner portion of the part-spherical bearing element is mounted to the flap 11 that is supported by the assembly so that the flap 11 can pivot relative to the bearing element in any direction relative to the primary link arm 30 about a point forming the centre of the part-spherical bearing element. More specifically, the flap 11 includes a pair of parallel support assembly connection flanges 39 upstanding from a leading edge 40. A shaft 41 is immovably fixed to and extends between the flanges 39 and is either formed with, or carries, a part-spherical bearing surface 42 in a gap between the flanges 39. The part-spherical bearing surface 42 mates with the part-spherical bearing surface of the outer shell 38 to connect the flap 11 to the support assembly whilst allowing the flap 11 to pivot in any direction relative to the support assembly during retraction and deployment.

In an alternate embodiment, the first end of the primary link arm may be coupled to the opposite end of the intermediate link arm via a bearing, such as a part-spherical bearing, which allows the primary support arm to pivot relative to the intermediate link arm in any direction, together with a flap 11 attached to the second end of the primary link arm 30. In this case, the flap 11 will be pivotally attached to the second end of the primary link arm 30 for rotation about a single axis. This embodiment effectively differs from the first embodiment in that the primary link arm has been rotated, and the opposite end of the intermediate link arm modified, so that the part-spherical bearing is now between the intermediate link arm and the primary link arm, rather than at the second end of the primary link arm.

In yet another embodiment, the first end of the primary link arm may be coupled to the opposite end of the intermediate link arm via a bearing, such as a part-spherical bearing, which allows movement in any angular direction. The second end of the primary link arm may then also be attachable to a flap via a bearing, such as a part-spherical bearing, as well, so that the flap and primary link arm can rotate relative to each other in any angular direction.

It will be appreciated that the foregoing description is given by way of example only and that modifications may be made to the support assembly of the present invention without departing from the scope of the appended claims.

The invention claimed is:

1. An assembly to support a wing leading or trailing edge device during deployment and retraction of said wing leading or trailing edge device from a wing of an aircraft, the assembly comprising a fixed support member attachable to the support structure of an aircraft wing, an intermediate link arm having one end pivotally mounted to the support member for rotation relative to the support member about a first axis and, a primary link arm having a first end attached to the opposite end of the intermediate link arm such that the primary link arm and intermediate link arm are movable relative to each other, a second end of the primary link arm being configured for attachment to a wing leading or trailing edge device, wherein said first end of the primary link arm is attached to said opposite end of the intermediate link arm via a part-spherical bearing element so that the part-spherical bearing element allows the primary link arm, together with a wing leading or trailing edge attached to the second end of the primary link arm to move relative to the intermediate link arm in any direction during deployment or retraction of said wing leading or trailing edge device from an aircraft wing about said part-spherical bearing element.

2. An assembly according to claim 1, wherein the second end of the primary link arm is configured for attachment to a wing leading or trailing edge device so that the wing leading or trailing edge device can pivot relative to the primary link arm about a second axis during deployment or retraction of said wing leading or trailing edge device from an aircraft wing.

3. An assembly according to claim 2, wherein the first and second axes are not parallel to each other.

4. An assembly according to claim 1, wherein the first axis is substantially vertical.

5. An assembly according to claim 1, wherein the support member comprises a bracket immovably mountable to a structural component of the aircraft wing.

6. An assembly according to claim 5, comprising a pivot pin extending through said one end of the intermediate link arm and the support member to pivotally attach the intermediate link arm to the support member for rotation about said first axis.

7. An assembly according to claim 6, wherein the support member comprises a pair of spaced webs and said one end of the intermediate link arm comprises a pair of spaced flanges, the flanges being received between the webs of the support member so that holes in the webs and in the flanges align, said pin being received through said holes to couple the intermediate link arm to the support member for rotation about said first axis.

8. An assembly according to claim 1, wherein the part-spherical bearing element comprises inner and outer bearing races, the inner bearing race being received within and rotatable relative to the outer bearing race, the outer bearing race being immovably mounted in an opening in an end of the primary link arm.

9. An assembly according to claim 1, further comprising a flap having support flanges and a shaft extending between said flanges for attachment to said second end of the primary link arm.

10. An aircraft wing having at least one wing leading or trailing edge device and at least one assembly according to claim 1, supporting the or each wing leading or trailing edge device.

11. An assembly to support a wing leading or trailing edge device during deployment and retraction of said wing leading or trailing edge device from a wing of an aircraft, the assembly comprising a fixed support member attachable to the support structure of an aircraft wing, an intermediate link arm having one end pivotally mounted to the support member for rotation relative to the support member about a first axis and, a primary link arm having a first end attached to the opposite end of the intermediate link arm such that the primary link arm and intermediate link arm are movable relative to each other, a second end of the primary link arm being configured for attachment to a wing leading or trailing edge device, wherein the second end of the primary link arm is configured for attachment to a wing leading or trailing edge device via a part-spherical bearing element so that the part-spherical bearing element allows a wing leading or trailing edge device to move relative to the primary link arm in any direction during deployment or retraction of said wing leading or trailing edge device from an aircraft wing about said part-spherical element.

12. An assembly according to claim 11, comprising a second pivot pin extending through said opposite end of the intermediate link arm and the primary link arm to pivotally attach the intermediate link arm to the primary link arm for rotation about said second axis.

13. An assembly according to claim 12, wherein said opposite end of the intermediate link arm comprises a pair of spaced flanges and said first end of the primary link arm comprises a pair of spaced flanges that are spaced by a distance which is less than the distance between the spaced flanges on the intermediate link arm so that the flanges of the primary link arm fit between the flanges of the intermediate link arm, said second pivot pin extending through aligned holes in said flanges to couple the primary link arm to the intermediate link arm for rotation about said second axis.

14. An assembly according to claim 11, wherein the part-spherical bearing element comprises inner and outer bearing races, the inner bearing race being received within and rotatable relative to the outer bearing race, the outer bearing race being immovably mounted in an opening in an end of the primary link arm.

* * * * *